United States Patent [19]
Smith et al.

[11] Patent Number: 6,092,129
[45] Date of Patent: Jul. 18, 2000

[54] METHOD AND APPARATUS FOR COMMUNICATING SIGNALS BETWEEN CIRCUITS OPERATING AT DIFFERENT FREQUENCIES

[75] Inventors: Donald W. Smith, Santa Clara; Jack H. Choquette, Los Altos, both of Calif.

[73] Assignee: SandCraft, Inc., Santa Clara, Calif.

[21] Appl. No.: 09/059,614

[22] Filed: Apr. 13, 1998

[51] Int. Cl.[7] ...................................................... G06F 1/04
[52] U.S. Cl. ............................................. 710/60; 713/400
[58] Field of Search .................................... 713/400, 500, 713/501; 710/60, 61

[56] References Cited

U.S. PATENT DOCUMENTS

| | | | |
|---|---|---|---|
| 3,696,338 | 10/1972 | Preiss | 710/60 |
| 3,953,835 | 4/1976 | Cuccio et al. | 710/60 |
| 4,327,411 | 4/1982 | Turner | 710/60 |
| 4,463,443 | 7/1984 | Frankel et al. | 710/60 |
| 4,607,345 | 8/1986 | Mehta | 710/60 X |
| 5,133,078 | 7/1992 | Minassian et al. | 710/60 X |

*Primary Examiner*—Thomas M. Heckler
*Attorney, Agent, or Firm*—Blakely, Sokoloff, Taylor & Zafman

[57] ABSTRACT

One embodiment of the present invention provides a state machine that receives as input a clock signal and determines a frequency relationship between circuits. The state machine generates outputs that control buffer circuits. The buffer circuits latch signals input to them until the output signals from the state machine cause the buffer circuits to latch new input signals. The buffer circuits are used to latch data until that data can be used appropriately.

20 Claims, 6 Drawing Sheets

METHOD AND APPARATUS FOR COMMUNICATING SIGNALS BETWEEN CIRCUITS OPERATING AT DIFFERENT FREQUENCIES

FIELD OF THE INVENTION

The present invention relates to communication of signals in an electronics system, and more specifically, to communication of signals between circuits operating at different frequencies.

BACKGROUND OF THE INVENTION

In many electronics systems different components of the system operate in response to different clock signals because the different components are capable of operating at different frequencies. For example, in a computer system the bus connecting the processor with other components, such as memory, I/O devices, etc., may operate at one frequency while the processor operates at a higher frequency.

Such a system allows components of the system to be designed and built without regard to the operating frequencies of the other components. Thus, components that are capable of operating at high frequencies may do so without being slowed down by working with a slower component.

Intercommunication between components, however, must be coordinated such that data is available at known times so that the data may be sampled on appropriate clock transitions in both the higher frequency and the lower frequency components. Therefore, what is needed is a method and apparatus for communicating signals between circuits operating at different clock frequencies.

SUMMARY OF THE INVENTION

The present invention provides method apparatus for communicating signals between a first circuit operating at a first frequency and a second circuit operating at a second frequency, wherein the first frequency is higher than the second frequency. A control circuit receives a clock signal operating at the first frequency and determines the relationship between the first frequency and the second frequency. The control circuit generates control signals. A first buffer circuit is coupled to receive signals from the first circuit and output signals to the second circuit. The first buffer is controlled by the control circuit. A second buffer circuit is coupled to receive signals from the second circuit and to output signals to the first circuit. The second buffer also controlled by the control circuit. The first buffer and the second buffer communicate signals between the first circuit and the second circuit such that signals communicated to the respective circuits are available during appropriate time periods.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

A method and apparatus for communicating signals between circuits operating at different clock frequencies is described. In the following description, for the purposes of explanation, numerous specific details are set forth in order to provide a thorough understanding of the present invention. It will be apparent, however, to one skilled in the art that the present invention may be practiced without these specific details. In other instances, well known structures and devices are shown in block diagram form in order to avoid obscuring the present invention.

In the descriptions that follow, various signals are described as being asserted (high) or deasserted (low). A high signal typically represents a voltage of between 1.8 and 5.5 Volts, and a low signal typically represents a voltage of between 0.0 and 0.5 Volts. However, the present invention can be implemented with signals which are asserted in a low state and deasserted in a high state, or with a combination of the assertion levels described above.

Briefly, one embodiment of the present invention provides a state machine that receives as input a clock start signal, a clock signal, and one or more signals designating a frequency relationship between circuits. From these inputs, the state machine generates control signals that control buffer circuits. The buffer circuits latch signals input to them until the output signals from the state machine cause the buffer circuits to latch new signals. The buffer circuits are used to latch data until used. In alternative embodiments, the state machine may also receive two or more clock signals and determine the relationship between the clock frequencies.

According to one embodiment, the present invention communicates signals between circuits operating at two different frequencies, where relationship between the frequencies is one of four predetermined ratios. However, as can be seen from the description below, many more than four ratios may be supported according to the teachings of the present invention. Also, the present invention is described in terms of communicating a signal from logic operating at one frequency to logic operating at a higher frequency. Any number of signals may be communicated in the same manner. In addition, the present invention is not limited to communication between system circuitry and processor circuitry. The present invention may be used to communicate between any two sets of circuitry operating at different frequencies.

Figure 1:
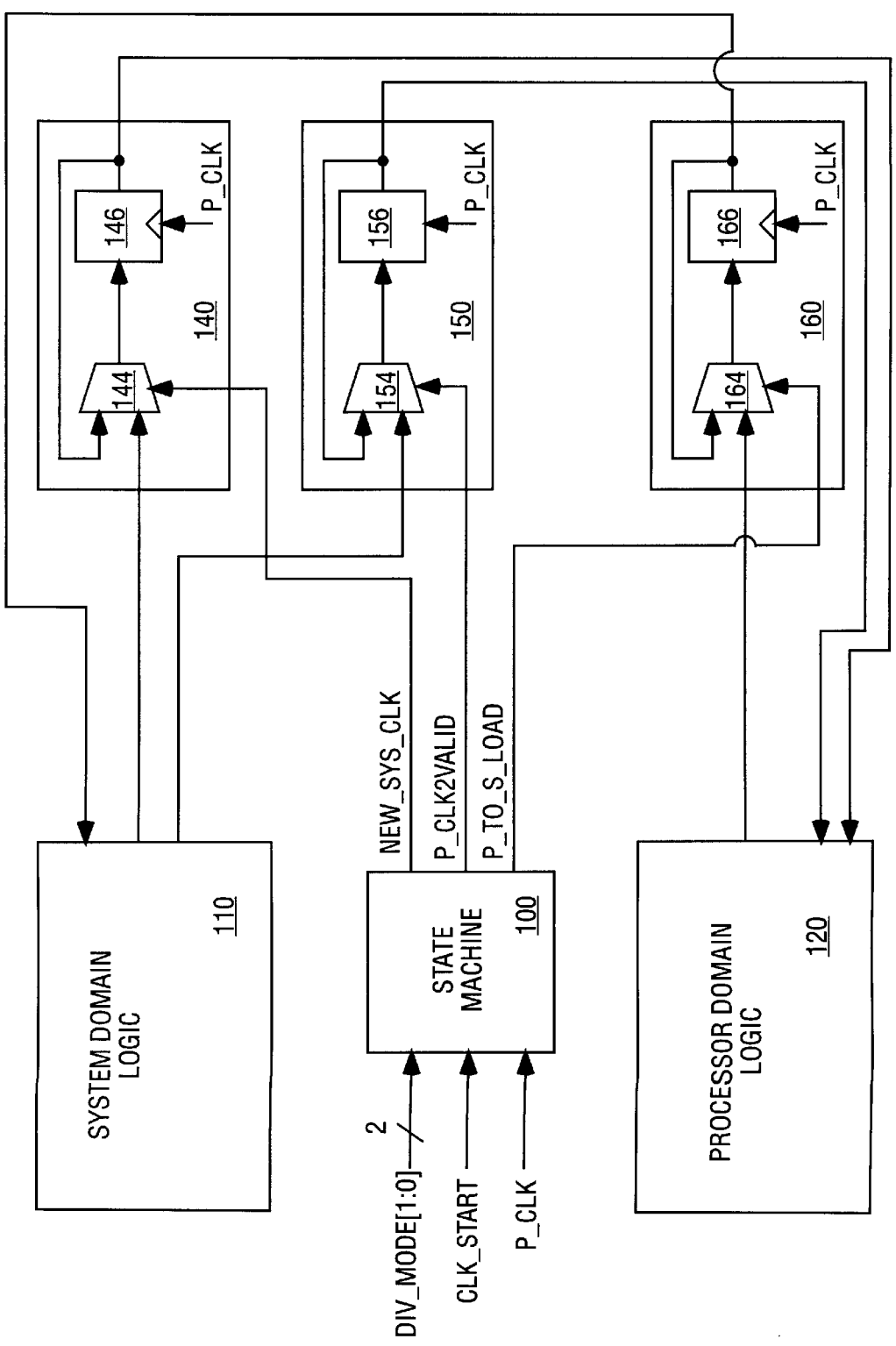
FIG. 1 is one embodiment of circuitry communicating signals between two circuits operating at different frequencies according to the present invention.

FIG. 1 is one embodiment of circuitry communicating data between circuits operating at different frequencies according to the present invention. The circuitry communicates data between system domain logic 110 and processor domain logic 120. For purposes of discussion, processor domain logic 120 operates at a higher frequency than system domain logic 110.

Communication occurs by state machine 100 generating control signals for system-to-processor buffer 140, system-to-processor buffer 150 and processor-to-system buffer 160. System-to-processor buffer 140 communicates data from a lower frequency domain to a higher frequency domain during the first full high frequency clock cycle of a particular lower frequency clock cycle. System-to-processor buffer 150 communicates data from the lower frequency domain to the higher frequency domain during the second full high frequency clock cycle of a particular lower frequency clock cycle. Processor-to-system buffer 160 communicates data from a higher frequency domain to a lower frequency domain. Thus, if system domain logic 110 operated at a higher frequency than processor domain logic 120, the data input and data output signals of buffers 140, 150 and 160 would be reversed.

State machine 100 receives as input signals the higher frequency signal of the two clock signals (P_CLK), a clock start signal (CLK_START) and one or more signals (DIV_MODE) indicating the relationship between the P_CLK signal and the slower clock signal (SYS_CLK). In one embodiment, the DIV_MODE signals comprise two bits (DIV_MODE [1:0]). Thus, four frequency relationships are supported; however, additional or different frequency relationships may also be supported. In one embodiment, the four frequency relationships supported are 2:1, 2.5:1, 3:1, and 4:1, however, any relationship may be supported with appropriate modifications. In one embodiment, the DIV_MODE[1:0] signals indicate the following:

TABLE 1

| | DIV_MODE bits | |
|---|---|---|
| DIV_MODE[1:0] | DIVIDE_MODE | P_CLK:SYS_CLK |
| 00 | 0 | 2:1 |
| 01 | 1 | 2.5:1 |
| 10 | 2 | 3:1 |
| 11 | 3 | 4:1 |

DIVIDE_MODE is described in greater detail below with respect to FIG. 2.

State machine 100 generates three output signals in response to the input signals described above. The NEW_SYS_CLK signal controls system-to-processor buffer 140, the P_CLK2VALID controls system-to-processor buffer 150, and the P_TO_S_LOAD signal controls processor-to-system buffer 160. To support additional or different frequency relationships, no additional output signals are required. However, additional signals may be generated to support specific behavior in a particular clock domain.

State machine 100 generates synchronization signals for managing signals that cross from the SYS_CLK domain to the P_CLK domain or from the P_CLK domain to the SYS_CLK domain. In order to determine alignment, the CLK_START signal is taken from the clock module(s) that generates the P_CLK signal and the SYS_CLK signal to determine when the P_CLK and the SYS_CLK signals are aligned properly; however, other alignment techniques may also be used. This clock module generates the P_CLK signal, the SYS_CLK signal, and the CLK_START signal, using conventional techniques (e.g., a phase-locked loop) such that the CLK_START signal is asserted when the P_CLK signal and the SYS_CLK signal are properly aligned relative to each other.

In one embodiment, a phase-locked loop (not shown in FIG. 1) is used to generate the CLK_START signal. The phase-locked loop receives as input a RESET signal and the SYS_CLK signal. The P_CLK signal is generated by doubling the SYS_CLK signal in the phase-locked loop. When the rising edges of the SYS_CLK and the P_CLK are aligned, the phase-locked loop asserts the CLK_START signal.

P_CLK2VALID indicates when incoming data is valid from the I/O pads in system domain logic 110. This signal is timed logically so that signals are taken from the pads on the second full P_CLK cycle of any SYS_CLK cycle. P_TO_S_LOAD is a control signal for signals that cross from the P_CLK domain to the SYS_CLK domain. The P_TO_S_LOAD signal is used so that the timing is predictable in system domain logic 110. The P_TO_S_LOAD signal allows for almost two P_CLK cycles for data signals to be used in system domain logic 110. This timing is used due to the propagation delay that occurs, for example, between interface logic and I/O pads.

System-to-processor buffer 140 generally comprises multiplexor 144 and latch 146. The NEW_SYS_CLK signal generated by state machine 100 controls selection of signals by multiplexor 144. The output of multiplexor 144 is coupled to the input of latch 146. The output of latch 146 provides input to processor domain logic 120 as well as an input to multiplexor 144. Latch 146 is clocked by the P_CLK signal. The second input to multiplexor 144 is generated by system domain logic 110. Thus, multiplexor 144 selects between signal(s) from system domain logic 110 and signal(s) that are fed back from latch 146. In one embodiment, when the NEW_SYS_CLK signal is high, the signal from system domain logic 110 is selected. When the NEW_SYS_CLK signal is low, the signal fed back from the output of latch 146 is selected. The signals latched by system-to-processor buffer 140 are latched on the first full P_CLK cycle of a SYS_CLK cycle.

System-to-processor buffer 150 comprises multiplexor 154 and latch 156 coupled in the same manner as multiplexor 144 and latch 146 in system-to-processor buffer 140. The P_CLK2VALID signal is coupled to the select input of multiplexor 154 to select between signal(s) from system domain logic 110 and signal(s) that are fed back from latch 156. In one embodiment, when the P_CLK2VALID signal is high, the signal from system domain logic 110 is selected. When the P_CLK2VALID signal is low, the signal fed back from the output of latch 156 is selected. The signals latched by system-to-processor buffer 150 are latched on the second full P_CLK cycle of a SYS_CLK cycle.

Processor-to-system buffer 160 generally comprises multiplexor 164 and latch 166. Multiplexor 164 is controlled by the P_TO_S_LOAD signal generated by state machine 100. The output of multiplexor 164 is input to latch 166. The output of latch 166 provides input to system domain logic 10 as well as multiplexor 164. Latch 166 is clocked by the P_CLK signal. The second input signal to multiplexor 164 is provided by processor domain logic 120. Multiplexor 164 selects between signal(s) from processor domain logic 120 and signal(s) that are fed back from latch 166. In one embodiment, the signal(s) from processor domain logic are selected when the P_TO_S_LOAD signal is high, and the fed back signal(s) are selected when the P_TO_S_LOAD signal is low.

State machine 100 counts P_CLK cycles and controls buffers 140, 150 and 160 such that output data is changed when the receiving circuitry can reliably use the data from the circuitry operating at a different frequency. Reliability is a function of timing constraints in the receiving clock domain. Because the outputs of latches 146, 156 and 166 are fed back into multiplexors 144, 154 and 164, respectively, the output of latches 146, 156 and 166 do not change until output signals from state machine 100 cause multiplexors 144, 154 and 164 to select a new input signal from the respective circuit providing the input signal. That signal is then output from the multiplexor to the respective latches, and fed back to the multiplexor. Thus, the output of latches 146, 156 and 166 only change when outputs from state machine 100 cause the multiplexors to switch inputs from the fed back latch output to data from the circuit providing input. It should be noted that the outputs of latches 146, 156 and 166 may, but are not required to, change at the same time.

It will be appreciated that the interface provided by the circuitry shown in FIG. 1 may be used in a microprocessor-based system. In such a system, most of the microprocessor's internal circuitry is clocked at the higher processor clock rate, and the input and output circuitry on the microprocessor is clocked at the slower system clock rate. The microprocessor is coupled to a bus (e.g. a "system" bus) and to external memory (e.g. DRAM) and to peripherals though the system bus. The memory and bus may be clocked at the system clock rate.

Figure 2:
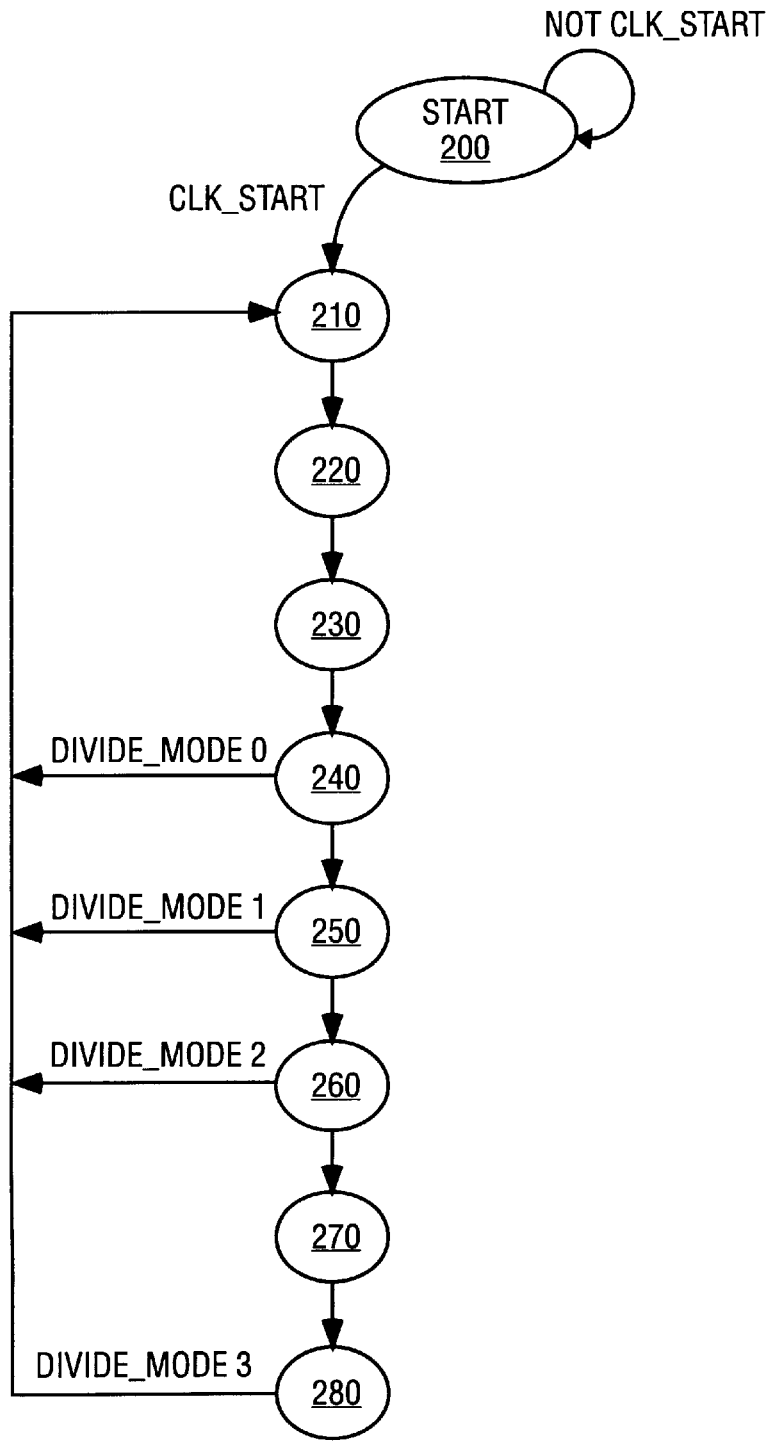
FIG. 2 is one embodiment of a state diagram of a state machine that is part of circuitry communicating signals between circuits operating at different frequencies according to the present invention.

FIG. 2 is one embodiment of a state diagram for state machine 100. The states represented in FIG. 2 assume that the four relationships between the clock frequencies described above are implemented. In order to provide communication between circuits operating at frequency relationships other than those discussed above a different number of states may be used. Output signals are discussed below as being high or low for one embodiment. Of course, changing a signal from a high asserted signal to a low asserted signal would change the levels of the signals in the states.

In one embodiment, the P_CLK cycles that comprise two SYS_CLK cycles are counted because a 2.5:1 clock relationship is supported. In order to start state machine 100 counting on the rising edge of both P_CLK and SYS_CLK each time state machine 100 counts P_CLK cycles, two SYS_CLK cycles are monitored. Thus, or 2:1, four P_CLK cycles are counted; for 2.5:1, five P_CLK cycles are counted; for 3:1, six P_CLK cycles are counted; and for 4:1, eight P_CLK cycles are counted. However, other numbers of SYS_CLK cycles may be used, such as four. In an embodiment that supports only 2:1, 3:1 and 4:1 clock relationships, only one SYS_CLK cycle need be used. In that embodiment, two, three and four P_CLK cycles, respectively, would be counted by state machine 100. In another example, if 3.33:1 or 1.167:1 clock relationships were supported, three or six SYS_CLK cycles may be used.

State machine 100 starts in state 200 and remains in state 200 for any P_CLK cycle for which the CLK_START signal is not asserted. In the first P_CLK cycle after CLK_START is asserted, state machine 100 enters state 210. During state 210, output signal NEW_SYS_CLK is high and P_CLK2VALID is low. P_TO_S_LOAD is high for DIVIDE_MODEs 2 and 3 and low for the other DIVIDE_MODEs in this example. Thus, P_TO_S_LOAD is high if the P_CLK to SYS_CLK ratio is 3:1 or 4:1.

The next P_CLK cycle causes state machine 100 to enter state 220. During state 220, P_CLK2VALID is high and NEW_SYS_CLK is low. P_TO_S_LOAD is determined by the DIV_MODE bits. The P_TO_S_LOAD signal is the output of an exclusive NOR (XNOR) operation on the DIV_MODE bits in state 220. Thus, P_TO_S_LOAD is high only for DIVIDE_MODEs 0 and 3 (P_CLK to SYS_CLK ratio of 2:1 or 4:1).

The next P_CLK cycle causes state machine 100 to enter state 230. During state 230, P_CLK2VALID is low. Both P_TO_S_LOAD and NEW_SYS_CLK are determined by the DIV_MODE bits in state 230. NEW_SYS_CLK is high if DIVIDE_MODE is 0 (clock ratio of 2:1) but is low in the other DIVIDE_MODEs of this example. P_TO_S_ LOAD is high for DIVIDE_MODE 1 and 2 (clock ratios of 2.5:1 and 3:1). Thus, P_TO_S_LOAD is an exclusive OR (XOR) of the DIV_MODE bits in state 230.

State machine 100 enters state 240 on the next P_CLK cycle. In state 240, all of the outputs are determined by the DIV_MODE bits. NEW_SYS_CLK is an XOR of the DIV_MODE bits in state 240. Thus, NEW_SYS_CLK is high for DIVIDE_MODE 1 and 2 and is otherwise low in this example. P_CLK2VALID is high for DIVIDE_MODE 0, in other words when both DIV_MODE bits are low, and P_CLK2VALID is otherwise low in this state. P_TO_S_ LOAD is high for DIVIDE_MODE 0, 2 and 3 in this example. Thus, P_TO_S_LOAD is low only for DIVIDE_MODE 1 in state 240.

The subsequent P_CLK cycle transitions state machine 100 to either state 210 or state 250. For DIVIDE_MODE 0 (both DIV_MODE bits low), state machine 100 returns to state 210. For all other DIVIDE_MODEs, the state 250 follows state 240. In DIVIDE_MODE 0 where the clock ratio of 2:1, two SYS_CLK cycles have been counted at state 240 and counting resumes in state 210 for the next set of two SYS_CLK cycles. When state machine 100 returns to state 210, the states described above are repeated until a NOT CLK_START signal is received by state machine 100.

In state 250, all three output signals are determined by the DIV_MODE bits. NEW_SYS_CLK is high for DIVIDE_ MODE 3 and low for DIVIDE_MODEs 1 and 2. P_CLK2VALID is high for DIVIDE_MODEs 1 and 2 and low for DIVIDE_MODE 3 during state 250. P_TO_S_ LOAD is high for DIVIDE_MODE 1 and 3 and low for DIVIDE_MODE 2 in state 250. In DIVIDE_MODE 1, the state following state 250 is state 210. For DIVIDE_MODEs 2 and 3, the subsequent state is state 260. Upon returning to state 210, in DIVIDE_MODE 1, state machine 100 repeats states 210 through 250 until the NOT CLK_START signal is asserted.

In state 260, NEW_SYS_CLK is low. P_CLK2VALID and P_TO_S_LOAD are high for DIVIDE_MODE 3, and these signals are respectively low and high for DIVIDE_ MODE 2 during state 260. In DIVIDE_MODE 2, the subsequent state is state 210. In DIVIDE_MODE 3, the subsequent state is state 270. In DIVIDE_MODE 2, states 210 through 260 are repeated by state machine 100 until the NOT CLK_START signal is asserted.

In state 270, NEW_SYS_CLK, P_CLK2VALID and P_TO_S_LOAD are all low. The next cycle of P_CLK transitions state machine 100 to state 280. In state 280, P_TO_S_LOAD is high. Both NEW_SYS_CLK and P_CLK2VALID are low. The next state is state 210, where the counting cycle starts again.

Figure 3:
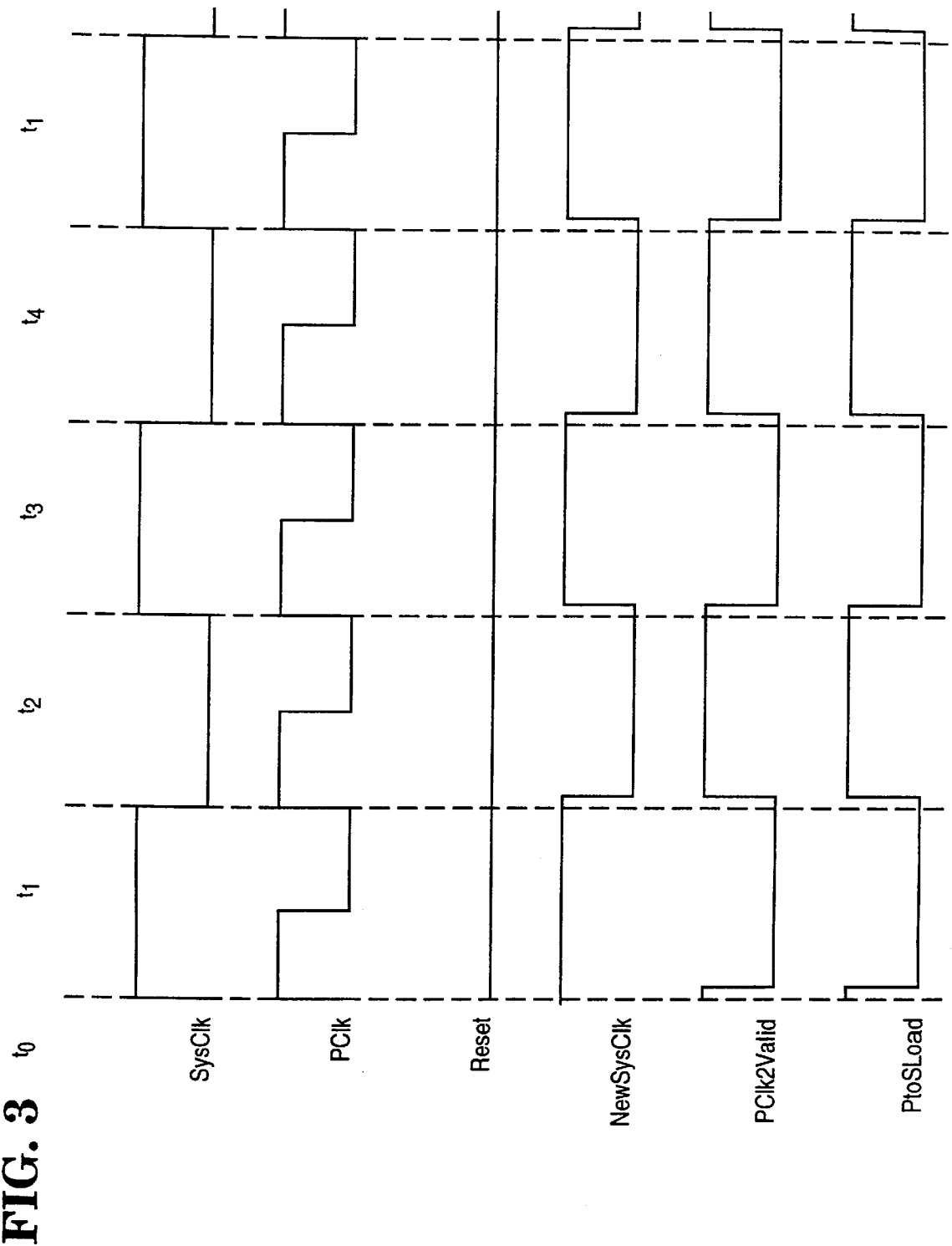
FIG. 3 is one embodiment of a timing diagram of signals in the circuitry of FIG. 1 where the clock frequencies have a 2:1 relationship.

FIG. 3 is one embodiment of a timing diagram of signals in the circuitry of FIG. 1 where the clock frequencies have a 2:1 relationship. The time periods of FIG. 3 ($t_0$ through $t_4$ as shown by the vertical lines) correspond to cycles of the P_CLK. Because of the 2:1 relationship between P_CLK and SYS_CLK, one SYS_CLK cycle takes two time periods. Both DIV_MODE[0] and DIV_MODE [1] are low because the 2:1 clock relationship corresponds to DIVIDE_ MODE 0.

State machine 100 is in state 200 for time periods $t_0$ because the CLK_START signal is deasserted during these time periods. During state 200 all three of the output signals from state machine 100 (NEW_SYS_CLK, P_CLK2VALID and P_TO_S_LOAD) are high. The CLK_START signal is asserted during a final $t_0$ time period, so state machine 100 transitions out of state 200 for the next time period.

Time period $t_1$ corresponds to state 210. During this period NEW_SYS_CLK is high. P_CLK2VALID and P_TO_S_LOAD are low. Time period $t_2$ corresponds to state 220. During this period NEW_SYS_CLK is low. Both P_CLK2VALID and P_TO_S_LOAD are high.

Time period $t_3$ corresponds to state 230. During this time period, NEW_SYS_CLK is high. P_CLK2VALID and P_TO_S_LOAD are low. Time period $t_4$ corresponds to state 240. During this period NEW_SYS_CLK is low. Both P_CLK2VALID and P_TO_S_LOAD are high. As discussed above, in DIVIDE_MODE 0, state machine cycles through states 210 through 240 until the RESET signal is asserted (which places the state machine into the NOT CLK_START state).

It is important to note that the output signals from state machine 100 are not clock cycles. For DIVIDE_MODE 0, NEW_SYS_CLK may appear to follow SYS_CLK. Also, P_CLK2VALID and P_TO_S_LOAD appear to be inverted versions of SYS_CLK. However, these relationships between the outputs of state machine 100 and SYS_CLK occur only for DIVIDE_MODE 0. For the other DIVIDE_MODEs, the output signals do not alternate between high and low for each time period.

Figure 4:
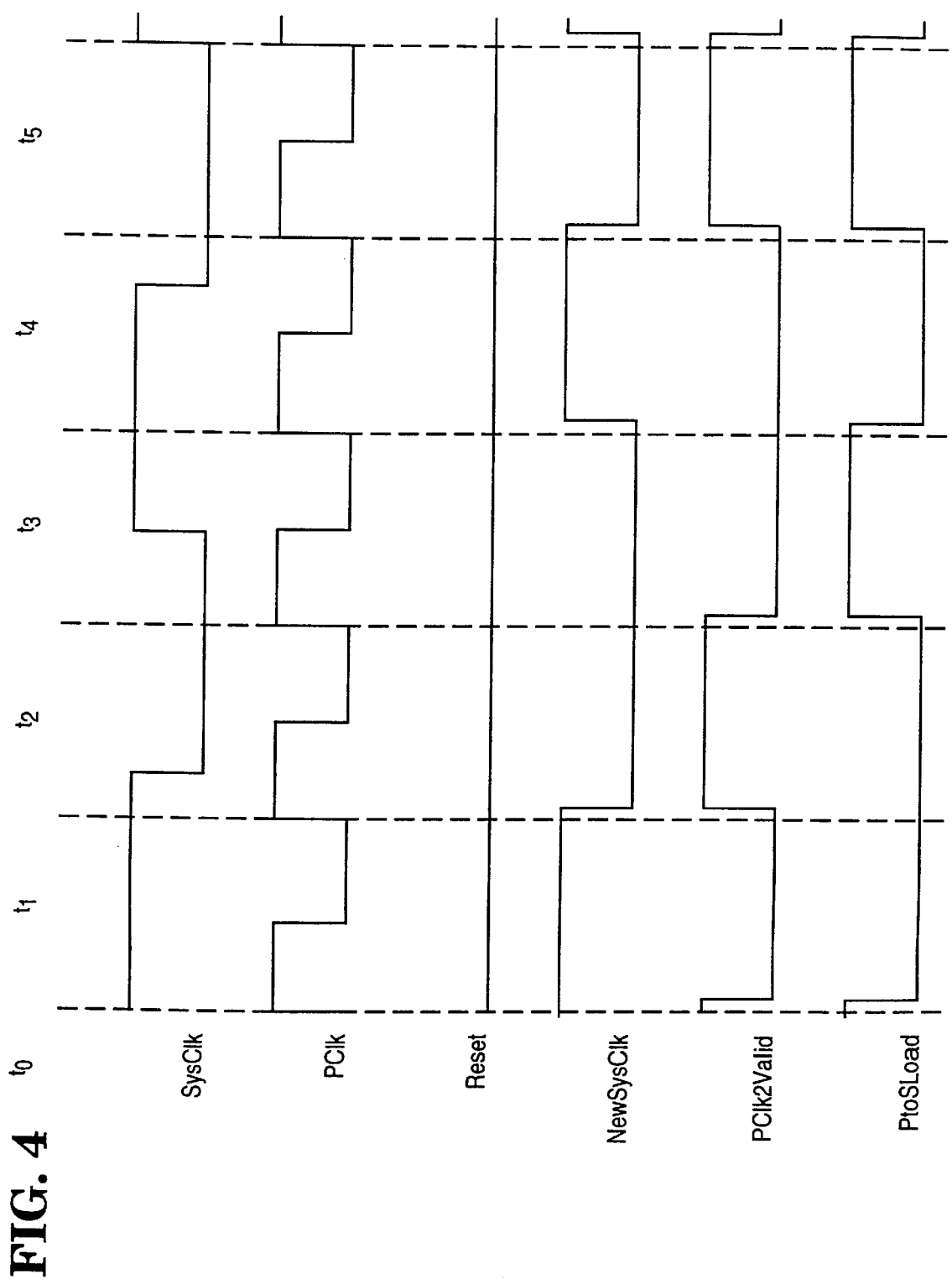
FIG. 4 is one embodiment of a timing diagram of signals in the circuitry of FIG. 1 where the clock frequencies have a 2.5:1 relationship.

FIG. 4 is one embodiment of a timing diagram of signals in the circuitry of FIG. 1 where the clock frequencies have a 2.5:1 relationship. Again, the time periods of FIG. 4 ($t_0$ through $t_5$) correspond to cycles of the P_CLK. Because of the 2.5:1 relationship between P_CLK and SYS_CLK, one SYS_CLK cycle takes two and a half time periods. DIV_MODE[0] is high and DIV_MODE [1] is low because the 2.5:1 clock relationship corresponds to DIVIDE_MODE 1.

Time period $t_0$ corresponds to state 200 because the CLK_START signal is asserted at the beginning of time period $t_0$. The CLK_START signal is deasserted during time period $t_0$, state machine 100 transitions to state 210 for time period $t_1$.

State machine 100 cycles through states 210 through 250 for DIVIDE_MODE 1. Time periods $t_1$ through $t_5$ correspond to a cycle through states 210 through 250, respectively. As can be seen from FIG. 4, the outputs of state machine 100 do not track either the P_CLK signal or the SYS_CLK signal.

Figure 5:
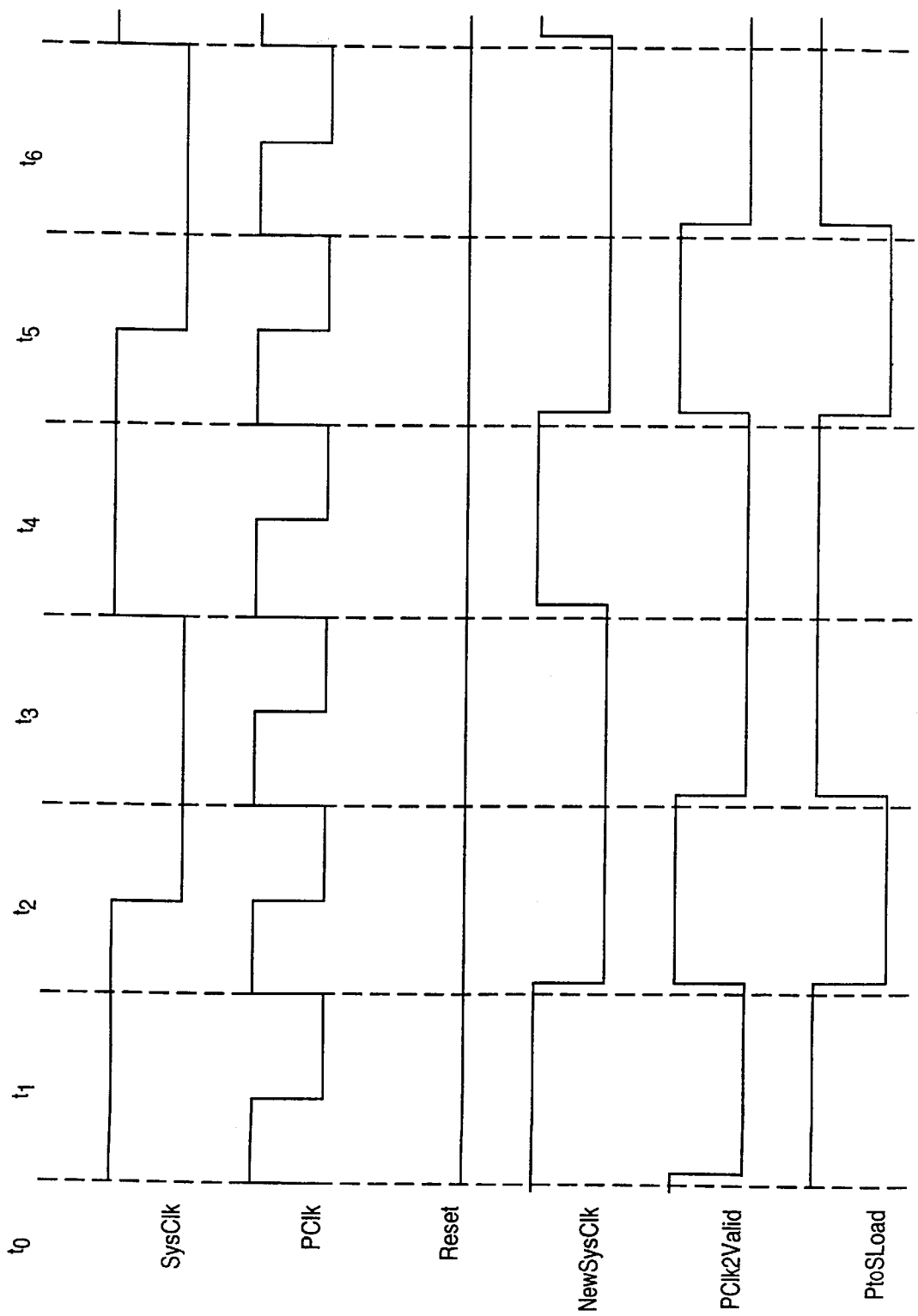
FIG. 5 is one embodiment of a timing diagram of signals in the circuitry of FIG. 1 where the clock frequencies have a 3:1 relationship.

FIG. 5 is one embodiment of a timing diagram of signals in the circuitry of FIG. 1 where the clock frequencies have a 3:1 relationship. The time periods of FIG. 5 ($t_0$ through $t_6$) correspond to cycles of the P_CLK. Because of the 3:1 relationship between P_CLK and SYS_CLK, one SYS_CLK cycle takes three time periods. DIV_MODE[0] is low and DIV_MODE [1] is high because the 3:1 clock relationship corresponds to DIVIDE_MODE 2.

Time period $t_0$ corresponds to state 200. Time periods $t_1$ through $t_6$ correspond to a cycle through states 210 through 260, respectively.

Figure 6:
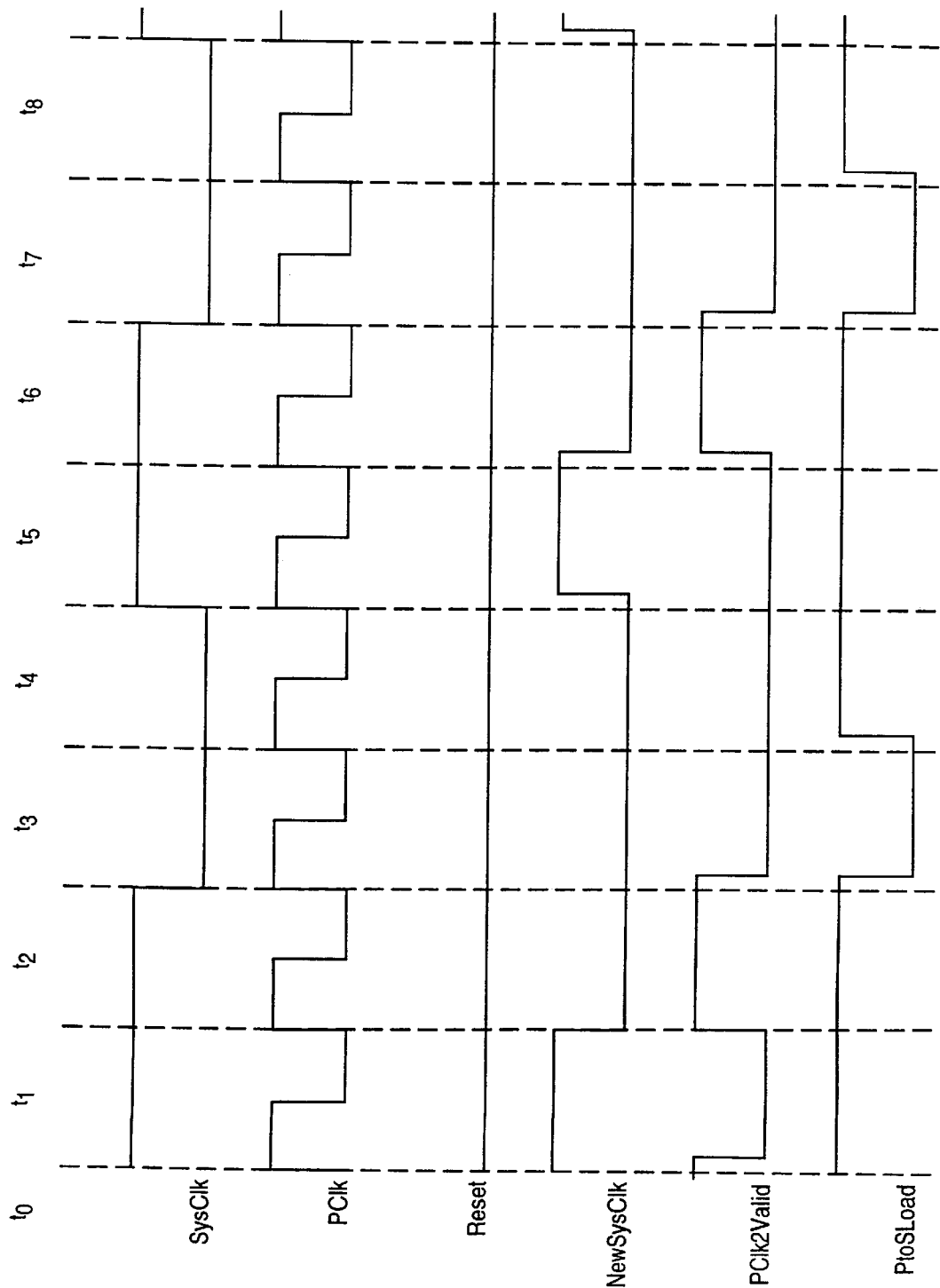
FIG. 6 is one embodiment of a timing diagram of signals in the circuitry of FIG. 1 where the clock frequencies have a 4:1 relationship.

FIG. 6 is one embodiment of a timing diagram of signals in the circuitry of FIG. 1 where the clock frequencies have a 4:1 relationship. The time periods of FIG. 6 ($t_0$ through $t_8$) correspond to cycles of the P_CLK. Because of the 4:1 relationship between P_CLK and SYS_CLK, one SYS_CLK cycle takes four time periods. Both DIV_MODE[0] and DIV_MODE [1] are high because the 4:1 clock relationship corresponds to DIVIDE_MODE 3.

Time periods $t_0$ corresponds to state 200. Time periods $t_1$ through $t_8$, respectively correspond to a cycle of states 210 through 280.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for communicating signals between a first circuit operating at a first frequency and a second circuit operating at a second frequency, wherein the first frequency is higher than the second frequency, the apparatus comprising:

a control circuit to receive a clock signal at the first frequency and one or more of a clock signal at the second frequency and a set of one or more bits indicating a relationship between the first frequency and the second frequency, the control circuit to determine the relationship between the first frequency and the second frequency;

a first buffer circuit to receive signals from the first circuit and to output signals to the second circuit, the first buffer circuit to receive a first control signal from the control circuit; and a second buffer circuit to receive signals from the second circuit and to output signals to the first circuit, the second buffer circuit to receive a second control signal from the control circuit;

wherein the first and second control signals control the first buffer and the second buffer to communicate signals between the first circuit and the second circuit such that signals communicated to the respective circuits are available during predetermined time periods.

2. The apparatus of claim 1, wherein the control circuit is a state machine.

3. The apparatus of claim 1, wherein the first buffer comprises:

a multiplexor having a first input and a second input, the first input coupled to receive feedback output signals of the first buffer and the second input coupled to receive the output signals of the first circuit, the multiplexor having a selecting input coupled to receive the first control signal; and a latch having an input coupled to an output of the multiplexor and an output coupled to provide the output signals of the first buffer, the latch also receiving a clock signal operating at the first frequency.

4. The apparatus of claim 1, wherein the second buffer comprises:

a multiplexor having a first input and a second input, the first input coupled to receive feedback output signals of the second buffer and the second input coupled to receive the output signals of the second circuit, the multiplexor also having a select input; and a latch having an input coupled to an output of the multiplexor and an output coupled to provide the output signals of the second buffer.

5. The apparatus of claim 1, wherein the third buffer comprises:

a multiplexor having a first input and a second input, the first input coupled to receive feedback output signals of the second buffer and the second input coupled to receive the output signals of the second circuit, the multiplexor also having a select input; and a latch having an input coupled to an output of the multiplexor and an output coupled to provide the output of the second buffer.

6. The apparatus of claim 1 further comprising a third buffer circuit to receive signals from the second circuit and to output signals to the first circuit, the third buffer circuit to receive a third control signal from the control circuit.

7. The apparatus of claim 6, wherein the second buffer latches signals during a first full cycle of a clock signal operating at the first frequency during a cycle of a clock signal operating at the second frequency and the third buffer latches signals during a second full cycle of the clock signal operating at the first frequency during the cycle of the clock signal operating at the second frequency.

8. An apparatus for communicating signals between a first circuit operating at a first frequency and a second circuit operating at a second frequency, wherein the first frequency is higher than the second frequency, the apparatus comprising:

means for determining a relationship between the first frequency and the second frequency by one of receiving bits indicating the relationship and comparing a clock signal at the first frequency to a clock signal at the second frequency;

means for counting a number of clock cycles that occur at the first frequency;

means for generating at least a first control signal to provide signals from the first circuit to the second circuit at predetermined times when data from the first circuit is valid; and means for generating at least a second control signals to provide signals from the second circuit to the first circuit at predetermined times when data from the second circuit is valid.

9. The apparatus of claim 8, wherein the means for determining a relationship between the first frequency and the second frequency comprises means for receiving a plurality of input signals that indicate the relationship between the first frequency and the second frequency.

10. The apparatus of claim 8, wherein the means for generating at least a first control signal comprises:

means for selecting an output signal from a first circuit to be the output signal from a first buffer circuit if the first control signal is asserted; and means for continuing to provide the output signal from the first buffer otherwise.

11. The apparatus of claim 8, wherein the means for generating at least a second control signal comprises:

means for selecting an output signal from a second circuit to be the output signal from a second buffer circuit if the second control signal is asserted; and means for continuing to provide the output signal from the second buffer otherwise.

12. A method for communicating signals between a first circuit operating at a first frequency and a second circuit operating at a second frequency, wherein the first frequency is higher than the second frequency, the method comprising:

determining a relationship between the first frequency and the second frequency by one of receiving bits indicating the relationship and comparing a clock signal at the first frequency to a clock signal at the second frequency;

counting a number of clock cycles that occur at the first frequency;

generating at least a first control signal to provide signals from the first circuit to the second circuit at predetermined times when data from the first circuit is valid; and generating at least a second control signals to provide signals from the second circuit to the first circuit at predetermined times when data from the second circuit is valid.

13. The method of claim 12, wherein determining a relationship between the first frequency and the second frequency comprises receiving a plurality of input signals that indicate the relationship between the first frequency and the second frequency.

14. The method of claim 12, wherein generating at least a first control signal comprises:

selecting an output signal from a first circuit to be the output signal from a first buffer circuit if the first control signal is asserted; and continuing to provide the output signal from the first buffer otherwise.

15. The method of claim 12, wherein generating at least a second control signal comprises:

selecting an output signal from a second circuit to be the output signal from a second buffer circuit if the second control signal is asserted; and continuing to provide the output signal from the second buffer otherwise.

16. The method of claim 12, wherein counting a number of clock cycles comprises transitioning through a sequence of states in a state machine, wherein each state corresponds to a clock cycle in a sequence of clock cycles.

17. The method of claim 16, wherein transitioning through a sequence of states comprises:

entering a first state corresponding to a first clock cycle in the sequence of clock cycles;

entering a second state corresponding to a second clock cycle in the sequence of clock cycles;

entering a third state corresponding to a third clock cycle in the sequence of clock cycles;

entering a fourth state corresponding to a fourth clock cycle in the sequence of clock cycles; and entering the first state if the relationship between the first frequency and the second frequency is 2:1.

18. The method of claim 17 further comprising:

entering a fifth state corresponding to a fifth clock cycle in the sequence of clock cycles if the relationship between the first frequency and the second frequency is not 2:1; and entering the first state if the relationship between the first frequency and the second frequency is 2.5:1.

19. The method of claim 18 further comprising:

entering a sixth state corresponding to a sixth clock cycle in the sequence of clock cycles if the relationship between the first frequency and the second frequency is not 2:1 and the relationship between the first frequency and the second frequency is not 2.5:1; and entering the first state if the relationship between the first frequency and the second frequency is 3:1.

20. The method of claim 19 further comprising:

entering the seventh state corresponding to a seventh clock cycle in the sequence of clock cycles if the relationship between the first frequency and the second frequency is not 2:1 and the relationship between the first frequency and the second frequency is not 2.5:1 and the relationship between the first frequency and the second frequency is not 3:1;

entering an eighth state corresponding to an eighth clock cycle in the sequence of clock cycles; and entering the first state.

* * * * *